Feb. 17, 1931.                A. STOLL                1,793,141
MACHINE ELEMENT
Filed May 21, 1930
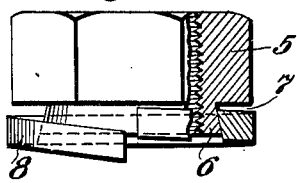
Fig.1.
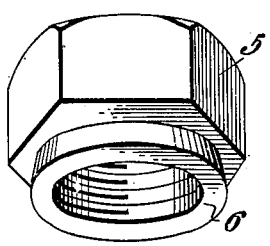
Fig.2.
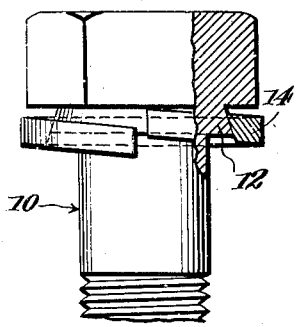
Fig.3.
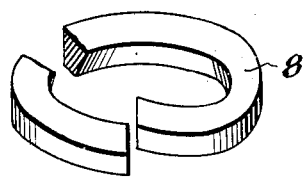
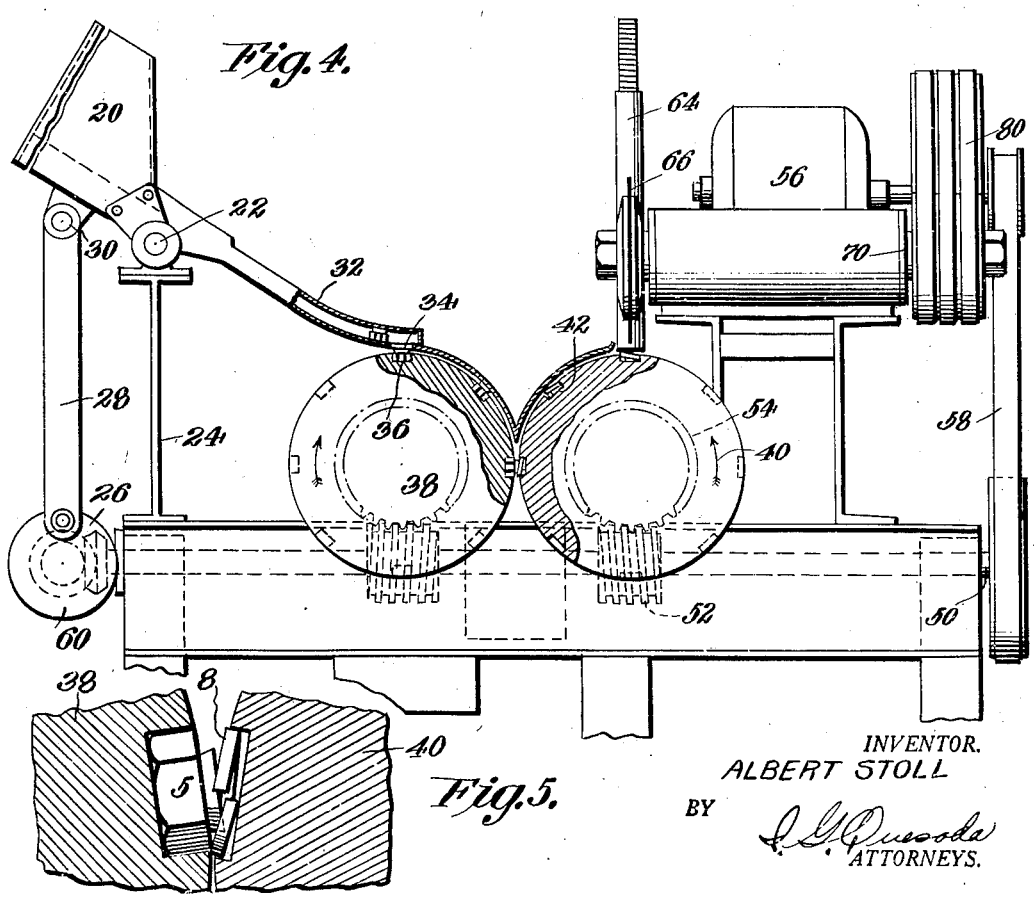
Fig.4.
Fig.5.
INVENTOR.
ALBERT STOLL
BY
ATTORNEYS.

Patented Feb. 17, 1931

1,793,141

UNITED STATES PATENT OFFICE

ALBERT STOLL, OF DETROIT, MICHIGAN, ASSIGNOR TO NATIONAL MACHINE PRODUCTS COMPANY, OF DETROIT, MICHIGAN, A CORPORATION OF MICHIGAN

MACHINE ELEMENT

Application filed May 21, 1930. Serial No. 454,474.

This invention relates to fastening devices of the type in which lock washers are carried thereby.

One of the features of this invention resides in the provision of simple means by which a split washer may be rotatably coupled to a machine element to allow these parts to be handled as a unit, the coupling means, when the machine element is in the form of a nut, being in the nature of a flared annular protuberance or extension of the nut having the inner wall thereof threaded along with the bore of the nut to provide for an increase in the length of the threads without a corresponding increase in the depth of the nut, it being noted in this connection that the construction of the washer and the manner of attaching the same to the nut permits threading of the nut and the annular protuberance thereof before the washer is attached to the nut, this latter feature of the invention making it possible to employ standard nut making and threading equipment and to pursue established manufacturing practice.

The invention will further be found to provide a coupled machine element and lock washer therefor in which the coupling means for these parts does not in any way limit the diameter in which the washer may be made and in which the washer has the ends thereof cut sharply at angles to define relatively stout teeth which bite into the surfaces between which the same are clamped, to the end that the machine element such, for example, as a nut or a cap screw is held firmly in place.

Other objects and advantages will be apparent during the course of the following description.

In the accompanying drawing forming a part of this application and in which like numerals are employed to designate like parts throughout the same, Figure 1 is a side elevation of a coupled nut and washer embodying the invention, parts being shown in section.

Figure 2 is a group perspective illustrating the nut and washer.

Figure 3 is a fragmentary side elevation illustrating a coupled cap screw and lock washer, parts being broken away.

Figure 4 is a fragmentary side elevation illustrating a preferred coupling means for the nut and washer, parts being shown in section, Figure 5 is a detail sectional view illustrating the manner in which the washer is spread preparatory to its application to the nut.

In the drawing, the numeral 5 designates a hexagonal or other polygonal nut which, of course, has the bore thereof threaded to provide for the connection of the nut with a bolt or other fastener.

As shown in Figure 2, the nut 5, and more particularly the base thereof, is provided with an annular concentric protuberance or extension 6 having the same internal diameter as the bore of the nut and threaded along with the bore of the nut to provide an increase in the length of the thread of the nut so that the nut is better enabled to withstand wrench and other pressures which might strip the threads of either the nut or the mating fastener or both of these elements; and at the same time to provide an increase in the interlocking connection between the nut and the bolt or the like to which it is attached with the result that the possibility of accidental loosening of the nut is diminished.

Figure 1 illustrates that the annular protuberance 6 is spaced inward from the sides of the nut to cooperate with the base of the nut in the formation of an external annular groove 7 deepened radially toward the crown of the nut and receiving a spring lock washer 8 of split helical form. In carrying out the invention, the annular protuberance 6 has the outer surface thereof flared from the base of the nut to the lower extremity of the protuberance, while the opposed contacting surface of the washer 8 is oppositely tilted to provide an overlapping retaining connection by which the washer is securely coupled to the nut.

Of course, the external groove 7 has a depth less than the thickness of the washer so that, when the washer is in contact with the base of the nut, the lower impinging face of the washer will extend beyond the protuberance for effective contact with the work of whatever nature it happens to be.

Otherwise expressed, the length of the protuberance or skirt 6 is less than the thickness of the washer so that when the nut is tightened on a bolt or the like, the skirt will not engage the work and interfere with the locking function of the washer.

The ends of the washer 8 are shown to be spaced slightly and to be cut or formed at angles to the axis of the nut to provide stout and yet sharp teeth to bite into the surfaces between which the same are confined so that the nut is locked firmly in place. Although the washer is shown to be of helical form, substantially more than one half its inner circumference is overlapped with the flared annular protuberance 6 to cause the washer to remain, at all times, firmly attached to the nut. It is important to observe that the mounting of the washer on the outer surface of the flared extension of the nut makes it possible to provide a washer of any desired outside diameter. That is to say, the coupling means by which the washer is permanently attached to the nut does not in any way limit the outside diameter in which the washer may be made. For example, in the drawing the washer is shown to have an external diameter greater than the maximum diameter of the nut.

The fact that the washer is split and is inherently flexible allows spreading of the washer for application of the same to the flared annular protuberance 6. This makes it possible to thread the nut 5 and the protuberance thereof before the application of the washed thereby permitting of the employment of standard nut making and threading equipment as distinguished from the possibility of applying an endless washer to an extension of the nut and then swedging the extension out into overlapping or retaining relation with the washer, after which, in this latter case, the nut and the protuberance must be threaded.

The maximum external diameter of the protuberance 6 is greater than the normal internal diameter of the embracing split washer 8 so that, by reason of the inherent flexibility of the washer, the washer will remain firmly in place on the protuberance. Thus, the washer and the nut may be handled as a unit to expedite production operations of various kinds as compared with the time required for the separate selection, handling and application of the washer and the nut when these parts are not united.

Figure 3 illustrates that a cap screw 10 may be provided at the juncture of the shank and head thereof with an annular shoulder or protuberance 12 having the outer surface thereof inclined inward toward the base of the head and embraced by a split washer 14, the inner surface of which is also inclined. With further reference to Figure 3, it will be seen that the annular coupling portion or shoulder 12 is integral with the shank and has a diameter greater than the diameter of the shank with the result that in addition to functioning as a washer coupling portion, the same serves to strengthen and reinforce the connection between the shank and the head. Figure 3 also illustrates that the direction of spiral of the helical washer 14 is opposite to the direction of spiral of the screw threads of the shank of the male fastener 10.

The mechanism illustrated in Figure 4 is for the purpose of assembling or coupling the nuts and washers and embodies a hopper 20 mounted on a horizontally disposed pivot element 22 which, in turn, is mounted on a standard 24. The hopper has connection with a crank 26 through the medium of a connecting rod 28, the upper end of which is pivoted to the hopper as indicated at 30. Obviously, operation of the crank 26 will oscillate the hopper to agitate the nuts placed therein so that the nuts are supplied to a downwardly inclined chute 32.

The nuts are conducted through the chute 32 with the protuberances thereof uppermost or presented outwardly so that when the nuts are dropped singly through the feed opening 34, in the bottom of the chute, and received within the polygonal sided sockets 36 in the peripheral portion of a carrier 38, the protuberances will be presented outward and extended beyond the periphery of the carrier.

The carrier 38 is in the nature of a driven disk that turns in the direction indicated to bring the nuts carried thereby into interlocking engagement with the washers carried by a second carrier 40. As shown in Figure 4, the washer carrier 40 is also in the nature of a driven disk and has the peripheral portion thereof provided with a plurality of uniformly spaced shallow sockets 42 into which the washers are directed singly.

In carrying out the invention, the carriers 38 and 40 are preferably of the same diameter and operate at the same speed to bring the sockets 36 and 42 thereof successively into registration. When the sockets are thus brought into registration, the nuts and washers positioned therein are brought into coupled relation and upon being moved toward the lower sides of the disks are allowed to drop into a suitable receiver. More specifically, the washers are presented to the nuts at an angle and are rolled or spread over the protuberances 6 to permanently interlock these elements so that the same may be handled as a unit.

In this connection, attention is invited to Figure 5 in which it is illustrated that, preparatory to the coupling of the washer and the nut, the protuberance is positioned angularly between the sides of the washer and is then caused to expand the washer radially so that the same may be slipped about the protuberance to closely embrace the same. Thus, the protuberance will be found to perform the three following separate functions:

1. To constitute a means for permanently coupling the split washer to the nut without at the same time limiting the diameter in which the washer may be made.

2. To provide a substantial increase in the length of the thread of the nut without a corresponding increase in the height of the nut.

3. To form a wedge or spreading device by which the washer is expanded radially for permanent application to the nut.

By way of further brief explanation of the nut and washer assembly mechanism, it might be pointed out that the carriers 38 and 40 are driven from a common shaft 50 through the medium of worms 52 mounted on the shaft and worm wheels 54 having rigid connection with the carriers.

Incidentally, the shaft 50 has connection at one end with a source of power 56 through the medium of a motion transmitting mechanism 58 of any nature. The other end of the shaft 50 has driving connection with the crank 26 through gears 60 or the like.

The washers 11 are fed to the carrier 40 by a magazine 64 in the form of a vertically arranged tube receiving a helically wound body or length of wire which is cut lengthwise and radially by a rotary cutter 66 to form separate helical spring washers. Of course, the arrangement herein disclosed for making the washers and coupling the same to the nuts contemplates the previous tempering of the metal from which the washers are formed.

The rotary cutter 66 is in the form of a relatively thin high speed grinding wheel of a type commercially available and cuts through the helically wound tubular body furnished to the magazine and at the same time sharpens the ends of the washers at an angle producing the relatively stout and yet sharp teeth to bite into the surfaces between which the washers are clamped. The rotary grinding wheel 56 is mounted on a shaft 70 having connection with the source of power 56 through a motion transmitting mechanism 80.

Having thus described the invention, what is claimed is:

1. In a structure of the class described, a nut having a base provided with an annular protuberance flared from the base of the nut to the free extremity of the protuberance and being spaced inwardly from the sides of the nut to cooperate with the base of the nut in the formation of an annular external groove deepened radially toward the base of the nut, and a helical split spring washer received in said groove and having the inner surface thereof inclined inwardly from the lower to the upper edges thereof for bearing engagement with the flared protuberance, the normal minimum internal diameter of the washer being less than the maximum diameter of the protuberance.

2. In a structure of the class described, a nut having a base provided with a concentric annular protuberance increased in thickness from the base of the nut to the lower extremity of the protuberance to define an inclined retaining wall, and a spring washer of split form embracing the protuberance and having an inner surface inclined to correspond to the inclined retaining wall of the protuberance and cooperating therewith to hold the washer permanently in place on the protuberance, the bore of the annular protuberance and the bore of the nut being threaded together and prior to the application of the washer.

3. In a structure of the class described, a nut having a protuberance increased in thickness from the base of the nut to the lower extremity of the protuberance to define an inclined retaining wall, and a spring washer of split form closely embracing the protuberance and having an inner surface inclined to correspond to the inclined retaining wall of the protuberance and cooperating therewith to hold the washer in place on the protuberance, the bore of the annular protuberance and the bore of the nut being threaded together and prior to the application of the washer, the ends of the washer being formed with teeth to bite into the surfaces between which the washer is clamped.

4. In a structure of the class described, a nut having a base provided with an annular protuberance flared toward the free end thereof and being spaced inwardly from the sides of the nut, and a split washer embracing said flared protuberance and having the inner circumferential edge inclined inward and contacting with the flared protuberance to retain the split washer securely on the protuberance, the outer edge portion of the washer being extended beyond the side walls of the nut.

5. In a structure of the class described, a nut having a base provided with an annular protuberance increased in wall thickness from the base of the nut to the lower extremity of the protuberance, the protuberance being internally threaded with the bore of the nut, and a split spring washer embracing said protuberance and having means cooperating with the outer wall of the protuberance to hold the washer on the protuberance, said protuberance being adapted to initially enter the washer at an angle to expand the same radially preparatory to the application of the washer to the protuberance.

6. A combined nut and lock washer comprising a threaded nut having a skirt concentric with the bore of the nut and forming a continuation thereof, the skirt being of less diameter than that of the nut, and a split lock washer having a single convolution resiliently embracing the skirt and retained thereon.

7. A combined nut and lock washer comprising a nut having a bore and an axially extending skirt, the bore of the nut being continued through the skirt, and a split washer having a single convolution embracingly surrounding the protuberance and thereby retained thereon, said washer having a thickness greater than the length of said skirt.

8. In a coupled nut and washer assembly, a nut having a base and a skirt extending from the base, said nut having a bore extending through said skirt, and a washer having a single split convolution surrounding said skirt, said washer and said skirt having means consisting of complemental faces on the skirt and the washer to hold the washer on the skirt.

9. In an assembly of the class described, a nut having a base and an externally flared skirt extending from the base, said nut having a bore threaded and extending through said skirt, and a lock washer having a single split convolution embracing the skirt and having a thickness greater than the length of the skirt, said washer having an inner wall disposed at an angle approximating the angle of the flare of said skirt and cooperating with the skirt in securing the washer on the skirt.

10. In an assembly of the class described, a nut having a base and a skirt extending from said base, said nut having a bore extending through said skirt, and a spring lock washer having a single split convolution embracing said skirt, a portion of said skirt remote from said base being externally enlarged to a diameter greater than the normal minimum diameter of the washer necessitating expansion of the washer to remove the same from the skirt.

11. In a structure of the class described, a screw threaded body having a bearing surface and an annular concentric washer coupling portion contiguous to the bearing surface, and a resilient lock washer embracing said coupling portion and having the outer edge thereof free, said washer and said coupling portion having means consisting of complemental faces on the coupling portion and the washer to permanently couple the washer to said threaded body to allow the washer and the threaded body to be handled as a unit.

12. In a structure of the class described, a screw threaded body having a bearing surface and an annular concentric washer coupling portion contiguous to said bearing surface, and a helical axially compressible lock washer embracing said coupling portion and having the outer edge thereof free, said washer and said coupling portion having means consisting of complemental faces on the coupling portion and the washer to permanently secure the washer to said threaded body, the direction of spiral of said helical washer being opposite to the direction of spiral of the screw threads of said body.

13. In a structure of the class described, a threaded male fastener having a shank and a head and an annular coupling portion in the region of the meeting point of the shank and the head, and a washer embracing said coupling portion and having the outer edge thereof free, said washer and said coupling portion having means consisting of complemental faces on the coupling portion and the washer to permanently couple the washer to said threaded body to allow the washer and the threaded body to be handled as a unit.

14. In a structure of the class described, a threaded male fastener having a shank and a head and formed at the junction of the shank and the head with an annular coupling and strengthening portion integral with the shank and having a diameter greater than the diameter of the shank, and a washer embracing said coupling and strengthening portion, said washer and said strengthening and coupling portion having means consisting of opposed cooperating faces to permanently couple the washer to said threaded body.

In testimony whereof I affix my signature.

ALBERT STOLL.